United States Patent [19]

Conrad

[11] Patent Number: 4,711,007
[45] Date of Patent: Dec. 8, 1987

[54] METHOD AND APPARATUS FOR INSTALLING FREE STANDING TURBINE BLADES

[75] Inventor: Kenneth C. Conrad, Birmingham, Pa.

[73] Assignee: Westinghouse Electric Corp., Pittsburgh, Pa.

[21] Appl. No.: 912,872

[22] Filed: Sep. 29, 1986

[51] Int. Cl.[4] .................. B21K 3/04; B23P 15/04; B64C 27/48; F01D 5/32

[52] U.S. Cl. ..................... 29/156.8 R; 29/525; 29/526 R; 416/221

[58] Field of Search ........... 29/156.4 R, 525, 526 R, 29/33 R; 416/220, 221

[56] References Cited

U.S. PATENT DOCUMENTS

| | | | |
|---|---|---|---|
| 3,039,740 | 6/1962 | Hockert | 416/221 |
| 3,045,329 | 7/1962 | Carli et al. | 29/156.8 R |
| 3,057,598 | 10/1962 | Boyle et al. | 416/221 |
| 3,378,230 | 4/1968 | Toomey | 416/221 |
| 3,700,354 | 10/1972 | Memery | 416/221 X |
| 4,050,134 | 9/1977 | Warner | 29/156.8 R |
| 4,130,379 | 12/1978 | Partington | 416/193 A |
| 4,466,776 | 8/1984 | Camboulives | 416/221 |
| 4,533,298 | 8/1985 | Partington et al. | 416/191 |

FOREIGN PATENT DOCUMENTS

| | | | |
|---|---|---|---|
| 747098 | 3/1956 | United Kingdom | 416/221 |
| 793930 | 4/1958 | United Kingdom | 416/221 |

*Primary Examiner*—Howard N. Goldberg
*Assistant Examiner*—Ronald S. Wallace

[57] ABSTRACT

An improved method and apparatus for installing rotatable, free standing turbine blades upon a rotor, includes coupling a locking device which substantially conforms to the curved arcuate surfaces of the blade to the bottom of the blade, and thereafter inserting the blade and locking device within a serration formed in the surface with the rotor, the combination being inserted from an inlet side thereof. A tapered shim is then inserted between the locking device at a relieved portion thereof and the bottom of the serration from an exit side thereof. The shim is tapped into place until no root movement occurs, thereby securing the blade within the serration, and preventng galling of the blade root portion or damage to the blade by eliminating the necessity for tapping the blade.

20 Claims, 11 Drawing Figures

METHOD AND APPARATUS FOR INSTALLING FREE STANDING TURBINE BLADES

BACKGROUND OF THE INVENTION

This invention relates generally to rotatable turbine blades, and more particularly to a method and apparatus installing free standing turbine blades which minimizes problems of galling caused during installation and removal of the turbine blades from their respective rotor.

In steam turbines, arrays of rotating blades are often joined together at their tips by a shroud ring which is normally riveted to the blades via tenons made integral with the blades. Since the tenon is an abrupt change in the cross-section of the blade, it is subject to stress cracking together with bending moments imposed by the shroud ring. It also provides crevices wherein corrosion products can accumulate, often resulting in corrosion cracking. The shroud rings nevertheless greatly reduce blade vibration or "fretting" at the blade root bearing surfaces.

As an alternative arrangement which avoids the necessity of joining the rotating blades at their tips, "free standing" turbine blades have also been used. In such an arrangement, the turbine blades are inserted into serrations formed around the outer periphery of the turbine rotor, and are wedged into place with appropriate combinations of shim stock. One prior art method of installing free standing turbine blades, referred to as the "kicker shim" method, involves the selection of one or more sizes of shims to fill the gap between the a locking device fitted to the root portion of the turbine blade and the bottom of the serration formed in the turbine rotor.

The filler shims selected are first installed at the bottom of the serration, and the turbine blade along with its associated locking device is reinstalled thereover by hand. If more or less filler shims are required, adjustments are made until the turbine blade and locking device can be installed a predetermined distance within the serration. Thereafter, a kicker shim covering only a portion of the length of the serration is installed under all of the other shims, and the blade is tapped into place with a hammer.

One major problem which often occurs with the above-described "kicker shim" method is that it causes the turbine blade roots to be galled or gouged during installation. Such galling is typically due to the necessity of impacting the blade with a hammer after the filler shim pack is tight. Moreover, the shim stock used can become jammed within the serration by deposits precipitated from the steam during flow across the turbine blades, thereby making removal of the blades during maintenance difficult.

It would, therefore, be desirable to employ a method for installing free standing turbine blades upon a rotor which minimizes galling and prevents blade fretting.

SUMMARY OF THE INVENTION

Accordingly, it is a general object of the present invention to provide a method of installing free standing turbine blades upon a rotor.

More specifically, it is an object of the invention to provide a method of installing free standing turbine blades which minimizes galling or gouging of the blade root surfaces.

It is a further object of the invention to provide a method of installing free standing turbine blades which prevents blade root fretting.

It is a still further object of the invention to provide a method of installing free standing turbine blades which minimizes assembly costs, and permits the blades installed in such a manner to be easily removed for maintenance or replacement.

Briefly, these and other objects of the invention are accomplished by a method of installing free standing turbine blades upon a rotor utilizing a tapered shim. A conventional locking device, formed to fit within the bottom of a serration in a turbine rotor surface, is mounted at the bottom of a blade root portion of the turbine blade, the blade/locking device assembly being subsequently installed within the rotor serration from an inlet side thereof. Since the locking device is longer than the turbine blade, excess portions remain at both the inlet and exit sides when the blade and rotor are properly aligned. Such alignment occurs when the inlet face of the blade root is brought flush with the inlet face of the rotor serration. When such an alignment is achieved a semicircular tangential groove on the top of the rotor is brought into alignment with a semicircular groove in the bottom of the blade platform, thus forming a round hole into which a retainer pin may conventionally be inserted.

In accordance with one important aspect of the invention, a tapered shim is then installed by hand between the locking device and the bottom of the serration at the exit side. The tapered shim is then tapped with a hammer until no root movement is detected when the tip of the blade is shaken tangentially by hand. Excess portions of the tapered shim are then cut off evenly with the end of the locking device, and both are bent over against the side of the rotor. Likewise, the excess portion of the locking device protruding from the inlet side is bent over against the rotor. Each blade is similarly secure in sequential fashion until the closing or unpinned blade is installed. As is conventional, the closing blade includes a pilot hole drilled into the trailing edge of its platform which is used to drill and tap a hole for insertion of a set screw, thus locking the unpinned blade in place.

Other object, advantages and novel features of this invention, will become apparent from the following detailed description of a preferred embodiment when considered in conjunction with the accompanying drawings wherein:

DESCRIPTION OF THE PREFERRED EMBODIMENT

Figure 1:
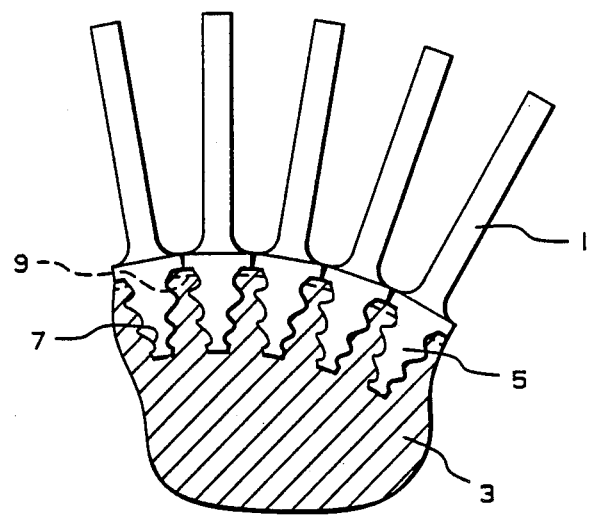
FIG. 1 is a partial sectional view of a circular array of rotatable, free standing blades disposed in a rotor.

Referring now to the drawings, wherein like characters designate like or corresponding parts throughout the several views, there is shown in FIG. 1 a portion of a circular array of rotatable, free standing turbine blades 1 disposed in a portion of a turbine rotor 3.

Figure 2:
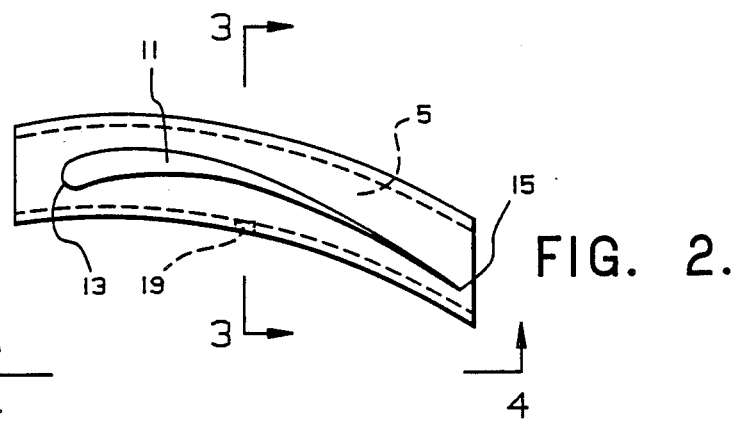
FIG. 2 is a plan view of a blade.
Figures 3, 4:
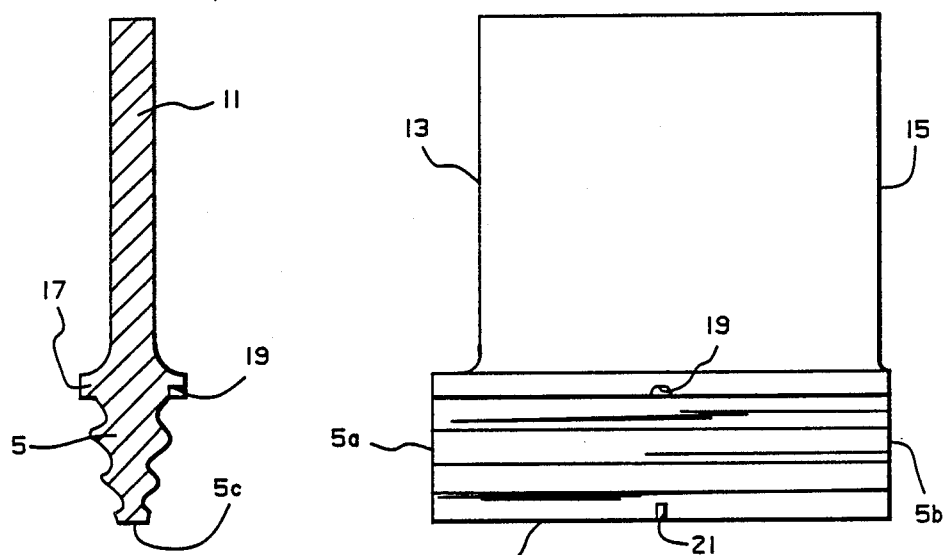
FIG. 3 is an elevation view of the blade shown in FIG. 2 taken along the lines 3—3.
FIG. 4 is a side view of the blade shown in FIG. 2 taken along the lines 4—4.

As shown best in FIGS. 2, 3 and 4, each turbine blade comprises a Christmas Tree shaped root portion 5 which registers with a similarly shaped groove or serration 7 in the rotor 3 to fasten the blades 1 to the rotor 3. To prevent axial movement of the blades 1, a pin (not shown) fits within a round hole formed by a tangential semicircular groove 9 in the rotor 3 which registers with a tangential semicircular groove 19 in the blade 1.

Extending radially outward from the root portion 5 is an air foil shaped blade portion 11 having leading and trailing edges 13 and 15, respectively, rising from a platform 17. The root portion 5, as shown best in FIGS. 2 and 4, is curved, generally described by a convex arcuate surface and a concave arcuate surface, with an inlet side 5a corresponding to the leading edge 13, an exit side 5b corresponding to the trailing edge 15, and bottom portion 5c in which is formed a perpendicular tangential groove 21.

Figure 5:
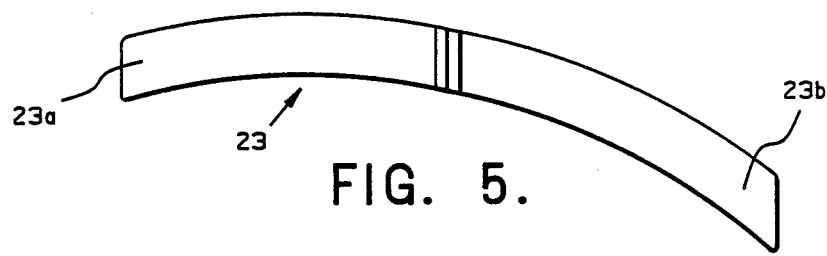
FIG. 5 is a plan view of a locking device utilized in accordance with the method of the present invention.
Figure 6:
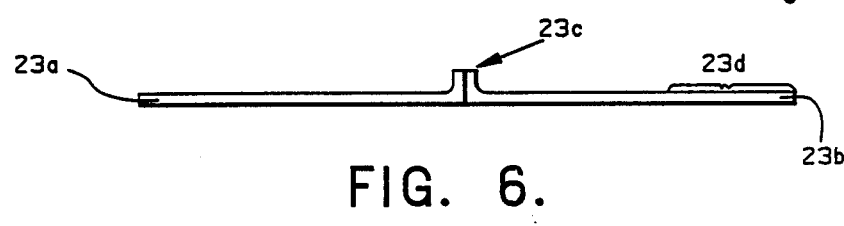
FIG. 6 is a side view of the locking device shown in FIG. 5.

With reference now to FIGS. 5 and 6, a locking device 23 is shown. The locking device 23 is comprised of a first portion 23a and a second portion 23b, each of the first and second portions 23a and 23b being bent at right angles at one end thereof to form a projection 23c which is formed to fit when joined together within the groove 21 in the bottom portion 5c of the blade 1. The first and second portions 23a and 23b may be joined together by fusing with suitable means, such as a tungsten inert gas torch with approximately 10 mils removed from the surface of portion 23b as indicated by 23d. That is, as shown in FIG. 6, the second portion 23b is relieved a small amount in the vicinity of 23d in order that a tapered shim 25 (FIG. 7 and 8) may be utilized in accordance with the present invention to secure the blade 1 within the serration 7. Such a device 23 may be distinguished from prior art turbine blade locking devices used with the "kicker shim" method in that those used in the prior art did not have a relieved area 23d which permits positive locking even when tolerances of manufacture of the blade root and serration vary substantially.

As is evident from FIG. 5, the locking device 23 is formed with convex and concave arcuate surfaces similar to that of the turbine blade 1, such that it may fit between the bottom portion 5c of the blade 1 when inserted within the serration 7. It should be noted at this juncture that the locking device 23 shown in FIGS. 5 and 6 is adapted for use as a left hand locking device. A similarly constructed right hand locking device is incapable of being interchanged with the left hand locking device 23 shown, the use of either locking device being determined by their application at either the generator and/or the governor end of a turbine.

Figure 7:
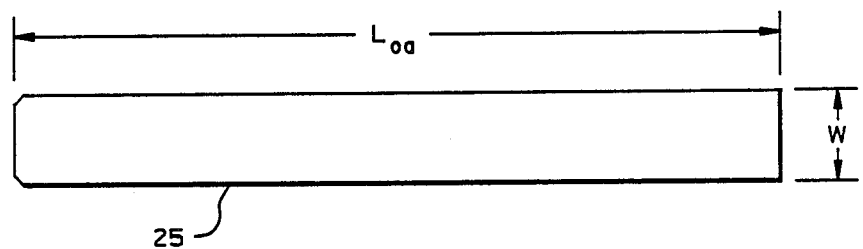
FIG. 7 is a plan view of a tapered shim utilized in accordance with the method of the present invention.
Figure 8:
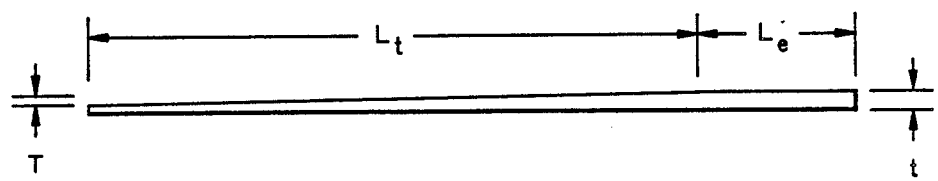
FIG. 8 is a side view of the tapered shim shown in FIG. 7.

Referring now to FIGS. 7 and 8, there is shown the tapered shim 25 which is used to secure the turbine blade 1 within its respective serration 7 in accordance with the present invention. The tapered shim 25 may be conveniently manufactured of a durable metal such as AISI 430 stainless steel, and is formed with an overall length $L_{oa}$ of approximately 60% the length of the locking device 23, and a width w adapted to fit within the serration 7 beneath the locking device 23. As shown more clearly in FIG. 8, the overall length $L_{oa}$ is comprised of a first untapered portion $L_e$ and a tapered length $L_t$ in the ratio of approximately 4 to 1. That is, along the untapered portion $L_e$ the tapered shim 25 has a thickness t which is subsequently tapered along the tapered portion $L_t$ at a taper rate T. The thickness t and taper rate T may be conveniently adjusted to accommodate differences in the machining of the serrations 7 with the taper rate T ranging from approximately 0.5° per inch to 1.0° per inch.

Figure 9A:
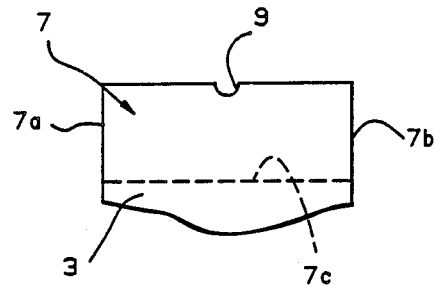
FIGS. 9a, 9b and 9c illustrate steps of a method for installing free standing blades in accordance with the present invention.
Figure 9A:
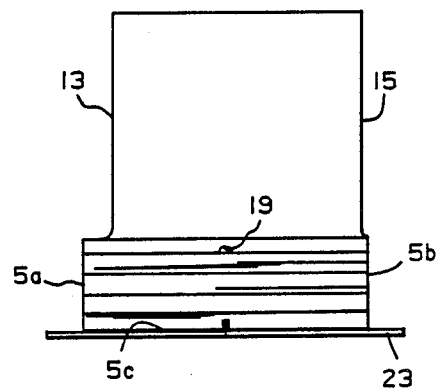
Figure 9B:
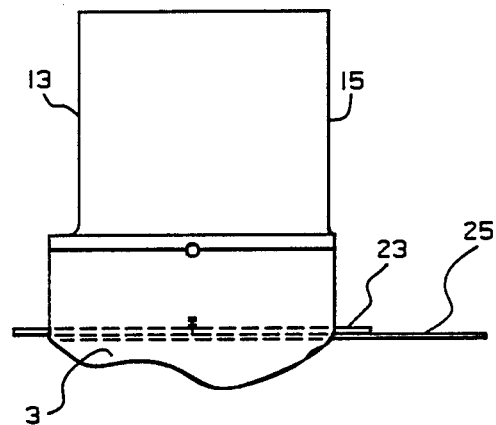
Figure 9C:
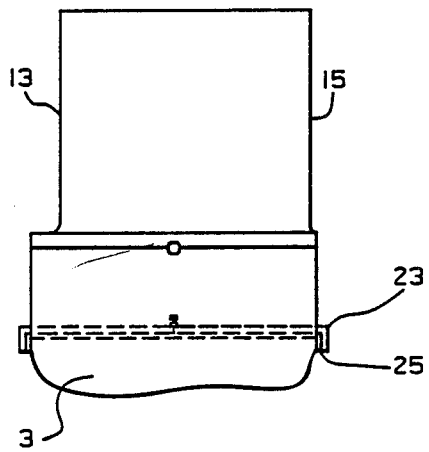

With reference now to FIGS. 9a, 9b and 9c, the method of installing the circular array oil-free standing blades 1, according to the most important aspect of the invention, comprises generally the sequential insertion of a blade 1 and its respective locking device 23 within a serration 7 such that the semicircular groove 19 formed under the concave side of the platform 17 registers with the complementary semicircular groove 9 which is circumferentially formed on the face of the rotor 3. A retainer pin (not shown) is inserted within the round hole formed by the grooves 9 and 19, and the next blade 1 with its respective locking device 23 is installed in the next sequential serration 7, covering the previously installed retainer pin. As each blade 1 is installed, after the entire array is installed, or at anytime in between, each installed blade 1 is secured by a tapered shim 25 which is inserted between its respective locking device 23 and serration 7. The tapered shims 25 are then tapped into place until no root movement is detected upon shaking the tip of the blade 1 tangentially by hand. Thereafter, both the locking device 23 and its associated tapered shim 25 are bent back against the side of the rotor 3, along with the excess portion of the locking device 23 which protrudes from the inlet face 5a.

With more particularity, the following will describe a method of installing free standing blades upon a rotor which avoids the problems such as galling or gouging of the blade root and turbine blade fretting, associated with prior art methods such as the "kicker shim" method. As shown in FIG. 9a, a locking device 23, selected depending upon whether the blade 1 is located at the generator end or the governor end of the turbine, is first coupled to the bottom 5c of the blade root portion 5 by inserting its projection 23c into the groove 21 formed in the bottom portion 5c. Since the locking device 23 is longer than the blade 1 at its blade root portion 5, an excess will protrude from beneath the blade root 5 at both its inlet face 5a and exit face 5b. As is conventional, the array of blades 1 may be laid out in descending numerical order and inspected prior to their installation upon the rotor 3. After the serrations 7 have been cleaned, they are inspected, such as by nondestructive testing, for burrs especially at their inlet slide 7a and exit side 7b corners. The corner at the bottom 7c of the serration 7 at its exit side 7b is especially critical when driving in the tapered shim 25. Anything rough will cause the shim to dig in and not tighten the blade on in its respective serration 7. Corrective action such as deburring must be taken to have a smooth seating surface.

Once the locking device 23 is coupled with its respective blade 1, the blade/locking device combination is inserted in the direction of the arrow A into the serration 7 until the hole formed by the grooves 9 and 19 are in registry. The blade 1 must slip freely into the serration 7 with its locking device 23. Working down from the highest numbered blade to the lowest numbered, or closing blade, the blades 1 are assembled upon the rotor 3 in a descending sequence.

FIG. 9b shows the blade/locking device combination inserted within the serration 7. When assembling each blade 1, the inlet face 5a of the blade root portion 5 is aligned flush with the inlet side 7a of the serration 7. If this is done appropriately, the semicircular groove 19 in the blade 1 and its complementary groove 9 in the rotor 3 should align to form a round hole into which the retainer pin (not shown) is inserted. Once the retainer pin is installed, the tapered shim 25 is inserted between the locking device 23 and the bottom of the serration 7 at its exit side 7b. Using a small hammer, the tapered shim 25 is tapped into place until no root movement is detected when the tip of the blade is shaken tangentially by hand, thus wedging the blade 1 within its serration 7. Care must be taken to tap the tapered shim 25 squarely or else it may bend before the blade 1 tightens. In such an occurrence, the damaged tapered shim 25 must be removed and a new shim 25 inserted in its place.

Referring next to FIG. 9c, the tapered shim 25 is shown trimmed off evenly with the end of the locking device 23 protruding from the exit side, with the locking device 23 and the tapered shim 25 both bent back together against the side of the rotor. The portion of the locking device 23 protruding at the inlet side 7a is also shown bent back. At this point, the tip of the blade 1 may be shaken tangentially to ensure that the root 5 is still tight.

The closing or unpinned blade (typically designated number 1) is conventionally altered by the inclusion of a pilot hole in the trailing edge 15 of its platform 17. After the entire array of blades 1 had been installed, the closing or unpinned blade is locked into place by drilling and tapping the pilot hole, and inserting a set screw therein. The ends of the set screw can subsequently be peened to prevent it from backing out, thus locking the unpinned blade in place.

It is readily apparent from the aforedescribed method that galling or gouging of the blade root and damage to the blade is minimized by employing a method which does not require the striking of the blade itself. Moreover, blade fretting is prevented by utilizing a secure method of installing free standing turbine blades with a tapered shim. Since the tapered shim, according to the present invention, is installed at the exit side, and since primary forces during steam flow are from the inlet side, a blade installed according to the present invention will wedge itself further up the tapered shim under typical forces of the steam flow. Removal of such blades installed according to the present invention is furthermore facilitated by the mere tapping of the blade to be removed from the exit side to unwedge the tapered shim.

Although particular embodiments of the invention have been shown and described and various modifications suggested, it will be appreciated that other embodiments and modifications which fall within the true spirit and scope of the invention as set forth in the appended claims will occur to those of ordinary skill of the art.

I claim as my invention:

1. A method of installing free standing turbine blades upon a rotor comprising the steps of:

(a) forming a plurality of serrations in a spaced relationship about an outer faced portion of said rotor, each of said serrations having a preselected cross-sectional area substantially conforming to the shape of a root portion of said blades, an inlet side, an exit side, and a bottom;
   (b) inserting each of said blades into a respective one of said serrations;
   (c) aligning an inlet face portion of each of said root portions with the inlet side of its respective serrations;
   (d) inserting, at the exit side of each serration between its respective blade and bottom, a tapered shim;
   (e) tapping each of said tapered shims;
   (f) shaking each of said blades at a tip portion thereof to check for movement of its respective root portion;
   (g) bending an excess portion of said tapered shim protruding from the exit side of serration back against the rotor; and
   (h) repeating step (f).

2. A method according to claim 1, further comprising:
   repeating steps (e) and (f) for each of said blades until no root movement occurs.

3. A method according to claim 1, wherein said forming step further comprises;
   cleaning said plurality of serrations;
   inspecting said cleaned serrations for burrs; and
   deburring said inspected serrations as required to prevent roughness therein.

4. A method according to claim 3, wherein said cleaning step comprises glass bead cleaning..

5. A method according to claim 3, wherein said inspecting step further comprises nondestructive testing.

6. A method according to claim 1, wherein said blade inserting step further comprises inserting a locking device into a slot formed in the bottom of each of said root portions.

7. A method according to claim 6, wherein said bending step further comprises bending a predetermined excess portion of said locking device protruding from said serrations at the inlet and exit side therof back against the rotor.

8. A method according to claim 7, wherein said tapered shim and its respective locking device are bend simultaneously back against the rotor.

9. A method according to claim 1, further comprising the steps of:
   arranging said blades in numerical order;
   inspecting said arranged blades;
   laying out a gauging line on each of said inspected blades.

10. A method according to claim 9, wherein said blades are arranged and installed in descending numerical order, the lowest numbered blade comprising a closing blade.

11. A method according to claim 10, further comprising the steps of:
   forming a semicircular groove about the outer face portion of said rotor;
   forming a complementary semicircular channel in an underside portion of each of said blades, said semicircular groove and said semicircular channel forming a circular key way upon proper alignment of said blades within their respective serrations;
   pinning each of said blades installed in descending numerical order, except said closing blade, by inserting a retainer pin within each of said circular key ways;

installing said closing blade;

drilling a hole in said closing blade at a predetermined location;

tapping said drill hole;

installing a screw within said tapped hole, said screw being adapted to conform to said tap; and peening said screw to lock said closing blade in place.

12. Improved apparatus for preventing gouging and fretting of a blade root in a free standing blade installed in a serration formed on a turbine motor, said serration having an exit side, wherein the improvement comprises:

locking means coupled between the blade root and the serration; and a tapered shim inserted beneath said locking means at an exit side of said serration, said tapered shim being wedged between said locking means and serration to secure the blade.

13. The improvement of claim 12, wherein said locking means comprises:

a first strip having a concave arcuate surface and a convex arcuate surface, said first strip being bent at approximately a right angle at one end thereof;

a second strip, having a concave arcuate and a convex arcuate surface similar to said first strip, said second strip being bent at approximately a right angle at one end thereof;

wherein said bent portions of said first and second strips are joined together to form a projection.

14. The improvement of claim 13, wherein said first and second strips are joined together with one of said strips have a relieved portion formed therein along a predetermined length thereof.

15. The improvement of claim 14, wherein said relieved portion comprises a surface relief of ten mils.

16. The improvement according to claim 15, wherein said surface relief extends for approximately one inch in from a tip of said strip.

17. The improvement of claim 13, wherein said strips are stainless steel.

18. The improvement of claim 12 wherein said tapered shim comprises:

a strip of metal having a width adapted to be inserted within a bottom portion of the serration, a tapered length with a taper of between 0.5°–1.0° per inch, and an untapered excess portion adapted to protrude from said serration at its exit side, thereafter being bent with said locking means to secure said blade within said serration.

19. An improved method of installing a free standing turbine blade having a root platform situated above a root portion of a predetermined cross-sectional area in a serration formed upon a rotor face, said serration having a complementary cross-sectional area substantially conforming to the root portion, an exit side and a bottom comprising the steps of:

(a) forming a tangential semicircular groove in the rotor face;

(b) forming a tangential semicircular groove in the platform above the root portion;

(c) forming a transverse slot in the root portion;

(d) mounting a locking means in said transverse slot, said locking means extending from the ends of the root portion;

(e) inserting said blade and said locking means into the serration;

(f) aligning said tangential semicircular grooves to from a cylindrical alignment hole;

(g) forming a tapered shim;

(h) inserting said tapered shim at the exit side of the serration between said locking means and the bottom of the serration;

(i) tapping said tapered shim;

(j) tangentially shaking the blade to check for movement of the root portion within the serration; and (k) bending said locking means and said tapered shim back against the rotor.

20. A method according to claim 19, further comprising:

repeating steps (i) and (j) before step (k) until movement of the root portion ceases; and repeating step (j) after step (k).

* * * * *